US009868112B2

(12) United States Patent
Ono et al.

(10) Patent No.: US 9,868,112 B2
(45) Date of Patent: Jan. 16, 2018

(54) FISCHER-TROPSCH SYNTHESIS CATALYST, MANUFACTURING METHOD THEREFOR, AND HYDROCARBON MANUFACTURING METHOD

(71) Applicant: JX NIPPON OIL & ENERGY CORPORATION, Tokyo (JP)

(72) Inventors: Hideki Ono, Tokyo (JP); Yoshiyuki Nagayasu, Tokyo (JP); Kazuaki Hayasaka, Tokyo (JP)

(73) Assignee: JX NIPPON OIL & ENERGY CORPORATION, Tokyo (JP)

( * ) Notice: Subject to any disclaimer, the term of this patent is extended or adjusted under 35 U.S.C. 154(b) by 353 days.

(21) Appl. No.: 14/809,565

(22) Filed: Jul. 27, 2015

(65) Prior Publication Data

US 2015/0328622 A1   Nov. 19, 2015

Related U.S. Application Data

(62) Division of application No. 13/581,935, filed as application No. PCT/JP2011/053011 on Feb. 14, 2011, now abandoned.

(30) Foreign Application Priority Data

Mar. 5, 2010  (JP) ............... P2010-049636

(51) Int. Cl.
```
B01J 23/75    (2006.01)
B01J 21/06    (2006.01)
B01J 21/08    (2006.01)
B01J 35/02    (2006.01)
B01J 35/10    (2006.01)
B01J 37/02    (2006.01)
B01J 37/18    (2006.01)
C10G 2/00     (2006.01)
B01J 37/10    (2006.01)
B01J 37/16    (2006.01)
B01J 37/34    (2006.01)
B01J 35/00    (2006.01)
B01J 35/08    (2006.01)
```

(52) U.S. Cl.
CPC ............ *B01J 23/75* (2013.01); *B01J 21/066* (2013.01); *B01J 21/08* (2013.01); *B01J 35/006* (2013.01); *B01J 35/023* (2013.01); *B01J 35/08* (2013.01); *B01J 35/1061* (2013.01); *B01J 37/0201* (2013.01); *B01J 37/10* (2013.01); *B01J 37/16* (2013.01); *B01J 37/18* (2013.01); *B01J 37/343* (2013.01); *C10G 2/332* (2013.01); *C10G 2300/70* (2013.01)

(58) Field of Classification Search
CPC .......... B01J 23/75; B01J 21/08; B01J 21/066; B01J 35/006; B01J 35/023; B01J 35/1061; B01J 37/0201; B01J 37/10; B01J 37/16; B01J 37/18; C10G 2/332; C10G 2300/70
USPC ......... 502/239, 242, 260, 325, 349; 518/715
See application file for complete search history.

(56) References Cited

U.S. PATENT DOCUMENTS

| 4,499,209 | A  | * | 2/1985  | Hoek ............... B01J 23/75 502/242 |
| 6,475,943 | B1 | * | 11/2002 | Hoek ............... B01J 23/75 502/31 |
| 6,521,565 | B1 |   | 2/2003  | Clavenna et al. |
| 7,056,955 | B2 | * | 6/2006  | Espinoza ......... B01J 21/06 518/714 |
| 9,359,270 | B2 | * | 6/2016  | Daly ............. B01J 23/8913 |
| 2004/0132834 | A1 |   | 7/2004  | Ortego et al. |
| 2007/0105963 | A1 | * | 5/2007  | Ikeda ............. B01J 23/75 518/718 |
| 2008/0064770 | A1 | * | 3/2008  | Rytter ............ B01J 23/75 518/726 |
| 2009/0305881 | A1 |   | 12/2009 | Sietsma et al. |
| 2012/0322899 | A1 | * | 12/2012 | Ono ............... B01J 23/8913 518/709 |
| 2012/0329890 | A1 | * | 12/2012 | Ono ............... B01J 21/066 518/715 |
| 2016/0144345 | A1 | * | 5/2016  | Nagayasu ........ B01J 23/75 518/715 |

FOREIGN PATENT DOCUMENTS

| CN | 101020137 |   | 8/2007  |                |
| EP | 1 736 239 |   | 12/2006 |                |
| GB | 2 153 250 | * | 8/1985  | ............. B01J 37/18 |
| JP | 59-102440 |   | 6/1984  |                |
| JP | 4-227847  |   | 8/1992  |                |
| JP | 05-208141 |   | 8/1993  |                |

(Continued)

OTHER PUBLICATIONS

"Fischer-Tropsch synthesis in slurry-phase reactors over Mn- and Zr-modified Co/SiO2 catalysts," Yanyong Liu et al. Fuel Processing Technology 90 (2009), pp. 901-908.*

"Silica supported cobalt Fischer-Tropsch catalysts: effect of pore diameter of support," A. M. Saib et al. Catalysis Today 71 (2002), pp. 395-402.*

Song et al., "Effect of catalyst pore size on the catalytic performance of silica supported cobalt Fischer-Tropsch catalysts", Journal of Molecular Catalysis A: Chemical, vol. 247, No. 1-2, Jan. 4, 2006, pp. 206-212.

Girardon et al. ("Effect of cobalt precursor and pretreatment conditions on the structure and catalytic performance of cobalt silica-supported Fischer-Tropsch catalysts," Journal of Catalysis 230(2), pp. 339-352, Mar. 2005).

(Continued)

*Primary Examiner* — Patricia L. Hailey

(74) *Attorney, Agent, or Firm* — Greenblum & Bernstein, P.L.C.

(57) ABSTRACT

A Fischer-Tropsch synthesis catalyst containing 10 to 30% by mass, as a metal atom, of metallic cobalt and/or cobalt oxide, based on the mass of the catalyst, supported on a carrier containing silica, in which the carrier has an average pore diameter of 8 to 25 nm and the metallic cobalt and/or cobalt oxide has an average crystallite diameter of not less than the average pore diameter of the carrier and less than 35 nm.

4 Claims, No Drawings

(56) References Cited

FOREIGN PATENT DOCUMENTS

| JP | 2008-238096 | 10/2008 |
|---|---|---|
| JP | 2009-520674 | 5/2009 |
| RU | 2 340 394 | 12/2008 |
| RU | 2362623 | 7/2009 |
| WO | 2005/099897 | 10/2005 |

OTHER PUBLICATIONS

Feller et al. ("Cobalt Cluster Effects in Zirconium Promoted Co/SiO2 Fischer-Tropsch Catalysts," Journal of Catalysis 185(1), pp. 120-130, Jul. 1999).
Office Action for CN Patent Application No. 201180012635.8, dated Nov. 14, 2013.
Office Action for Russian Patent Application No. 2012142316, dated Aug. 28, 2014.
Office Action for Japanese Patent Application No. 2012-503052, dated Sep. 16, 2014.
Office Action from the Cooperation Council for the Arab States of the Gulf with respect to Application GCC/P/2011/17830, dated Sep. 10, 2014.
Russian Office Action issued for Application No. 2012142316, dated Feb. 2, 2015.
Notice of Allowance issued for Russian application No. 2012142316, dated Feb. 2, 2015. (Reference was submitted in the IDS filed on May 26, 2015).
International Search Report issued with respect to PCT/JP2011/053011, dated May 10, 2011.
English-language translation of International Preliminary Report on Patentability issued with respect to PCT/JP2011/053011, dated Oct. 11, 2012.
Kiss et al., "Hydrothermal deactivation of silica-supported cobalt catalysts in Fischer-Tropsch synthesis", Journal of Catalysis, vol. 217, No. 1, Jul. 1, 2003, pp. 127-140.
Dalai et al., "Fischer-Tropsch synthesis: A review of water effects on the performances of unsupported and supported Co catalysts", Applied Catalysis A: General, vol. 348, No. 1, Jun. 24, 2008, pp. 1-15.
Ali et al., "Zr Promotion of Co/SiO2 for Fischer-Tropsch Synthesis", Journal of Catalysis, vol. 157, No. 1, Jul. 13, 1995, pp. 35-41.
Michalak et al., "Physico-Chemical Properties of Cobalt-Ruthenium (10% Co-0.5% Ru) Catalysts Supported on Binary Oxides 8.5%ZrO2/Support ($SiO_2$, $Al_2O_3$, $TiO_2$) Synthesis", TOP CATAL, vol. 52, No. 8, Apr. 14, 2009, pp. 1044-1050.
Zhou et al., "Effect of $ZrO_2$ on the stability of $Co/SiO_2$ catalyst for Fischer-Tropsch synthesis", Journal of Fuel Chemistry and Technology, vol. 34, No. 4, Aug. 8, 2006, pp. 461-465.
Saib et al., "Fundamental understanding of deactivation and regeneration of cobalt Fischer-Tropsch synthesis catalysts", Catalysis Today, vol. 154, No. 3-4, Mar. 15, 2010, pp. 271-282.

\* cited by examiner

FISCHER-TROPSCH SYNTHESIS CATALYST, MANUFACTURING METHOD THEREFOR, AND HYDROCARBON MANUFACTURING METHOD

The present application is a divisional of U.S. application Ser. No. 13/581,935, which is a National stage entry of International Patent Application No. PCT/JP2011/053011 filed Feb. 14, 2011 now abandoned, which claims priority to Japanese Application No. 2010-049636 filed Mar. 5, 2010, the entire contents of each being incorporated by reference herein in their entireties.

TECHNICAL FIELD

The present invention relates to a catalyst used for the Fischer-Tropsch synthesis reaction, a method for producing the catalyst, and a method for producing hydrocarbons by the Fischer-Tropsch synthesis reaction using the catalyst.

BACKGROUND ART

In recent years, regarding liquid fuels such as gasoline and gas oil, the control of a sulfur content and an aromatic hydrocarbon content has become rapidly stringent. Therefore, it has become essential to produce clean liquid fuels having low sulfur and aromatic hydrocarbon contents and being so-called friendly to the environment. Examples of the method for producing such clean fuels include a method in which hydrocarbons are synthesized by utilizing the so-called Fischer-Tropsch synthesis reaction (hereinafter, sometimes called as "FT synthesis reaction") reducing a carbon monoxide with a molecular hydrogen (hereinafter, sometimes called as "FT synthesis method"), using a synthesis gas obtained by reforming a hydrocarbon such as a natural gas, that is, a mixed gas of carbon monoxide and molecular hydrogen (hydrogen gas), as a feedstock. By the FT synthesis method, not only can be produced liquid fuel base stocks rich in paraffin hydrocarbons and containing no sulfur component, but also can be produced a wax simultaneously. Then, the wax can be converted into a middle distillate (a fuel base stock such as kerosene and gas oil) by hydrocracking.

As the catalyst used for the FT synthesis method (hereinafter, sometimes called as "FT synthesis catalyst"), a catalyst in which an active metal such as iron, cobalt, and ruthenium is supported on a porous inorganic carrier such as silica or alumina is generally used (for example, see Patent Literature 1). In addition, with respect to the FT synthesis catalyst, it is reported that by using the above active metal in combination with a second component metal compound, the catalyst performance is enhanced (for example, see Patent Literature 2 and Patent Literature 3). Examples of the second component metal include sodium, magnesium, lithium, zirconium, and hafnium, which are used as required according to the object such as enhancing the conversion of carbon monoxide and increasing the chain growth probability, an indicator of an amount of wax generation.

As the FT synthesis reaction is remarkably exothermic and has a high reaction rate, it is considered that the reaction is completed in the proximity of the outer surface of the catalyst. Accordingly, when a certain amount of an active metal is loaded on a catalyst, the presence of the active metal existed in the proximity of the outer surface of a catalyst particle leads to a high activity of the catalyst, so that it is attempted to load the active metal to be in the proximity of the outer surface (for example, see Patent Literature 3).

CITATION LIST

Patent Literature

Patent Literature 1: Japanese Patent Application Laid-Open Publication No. Hei-4-227847
Patent Literature 2: Japanese Patent Application Laid-Open Publication No. Sho-59-102440
Patent Literature 3: Japanese Patent Application Laid-Open Publication No. 2008-238096

SUMMARY OF INVENTION

Technical Problem

In the FT synthesis catalyst disclosed in Patent Literature 3, an active metal is distributed selectively in the proximity of the outer surface of a catalyst particle having a size of 10 µm to 10 mm and the distribution of the active metal is not controlled between the pore inside/pore outside (outer surface) of a porous inorganic carrier with a pore having a size of several tens nm. When such a control of the distribution of the active metal in a micro-scale becomes possible, an FT synthesis catalyst having further excellent performance is considered to be obtained. However, it is a present situation that in a catalyst obtained by a conventional production technique, the active metal is distributed in a large amount in an inside of pore of a porous inorganic carrier and is not effectively utilized for the reaction. Thus, the inventors of the present invention have made a study for solving the problem of developing an FT synthesis catalyst in which the distribution of the active metal in the inside/outside of the pore of the porous inorganic carrier is controlled.

As a result of assiduous research intended to overcome the above problems, the inventors of the present invention found a simple method for controlling the distribution of the active metal in a micro-scale and a novel FT synthesis catalyst having the distribution of the active metal which could not be obtained conventionally based on the above method, and completed the present invention.

That is, the present invention provides a Fischer-Tropsch synthesis catalyst containing 10 to 30% by mass, as a metal atom, of metallic cobalt and/or cobalt oxide, based on the mass of the catalyst, supported on a carrier containing silica, in which the carrier has an average pore diameter of 8 to 25 nm, and the metallic cobalt and/or cobalt oxide has an average crystallite diameter of not less than the average pore diameter of the carrier and less than 35 nm.

In the Fischer-Tropsch synthesis catalyst of the present invention (hereinafter, sometimes called as "FT synthesis catalyst of the present invention"), the cobalt atom/silicon atom molar ratio measured by an X-ray photoelectron spectroscopy is preferably 0.05 to 2.00.

In addition, the FT synthesis catalyst of the present invention preferably further contains 0.5 to 10% by mass of zirconium as zirconium oxide, based on the mass of the catalyst.

Further, the present invention provides a method for producing above-described Fischer-Tropsch synthesis catalyst comprising: a step of loading an active metal for loading a cobalt compound on a carrier containing silica having an average pore diameter of 8 to 25 nm so that the loading amount of the cobalt compound as a cobalt atom becomes 10 to 30% by mass, based on the mass of the catalyst; a step of calcining for calcining the carrier supporting the cobalt compound to obtain a catalyst precursor in which the cobalt compound is converted into cobalt oxide; a step of first reduction for reducing the catalyst precursor in an atmosphere containing at least molecular hydrogen to obtain a reduced catalyst precursor; and a step of steaming for treating the reduced catalyst precursor obtained through the step of first reduction with a mixed gas containing 1 to 30% by volume of steam and an inert gas at a temperature of 100 to 300° C. to obtain a Fischer-Tropsch synthesis catalyst.

The method for producing the Fischer-Tropsch synthesis catalyst of the present invention (hereinafter, sometimes called as "method for producing FT synthesis catalyst of the present invention") preferably comprises a step of loading zirconium for loading 0.5 to 10% by mass of zirconium as zirconium oxide, based on the mass of the catalyst, on particles containing silica having an average pore diameter of 8 to 25 nm and a step of calcining a carrier for calcining the zirconium-loaded particles containing silica to obtain a carrier containing silica before the step of loading an active metal.

In addition, the method for producing the FT synthesis catalyst of the present invention contains preferably a step of second reduction for further reducing the Fischer-Tropsch synthesis catalyst obtained through the step of steaming in an atmosphere containing molecular hydrogen or carbon monoxide.

Further, the present invention provides a method for producing a hydrocarbon by subjecting a feedstock containing carbon monoxide and molecular hydrogen to the Fischer-Tropsch synthesis reaction in the presence of the above-described FT synthesis catalyst to synthesize hydrocarbons.

Advantageous Effects of Invention

According to the present invention, an FT synthesis catalyst having high activity in which the distribution of the active metal between inside and outside of the pore of the carrier is controlled, a method for producing the catalyst, and an efficient method for producing a hydrocarbon using the catalyst.

DESCRIPTION OF EMBODIMENTS

Hereinafter, referring to preferred embodiments, the present invention is described in detail.

The carrier constituting the FT synthesis catalyst of the present embodiments contains silica. Examples of the carrier containing silica include, beside silica, silica containing a small amount of an inorganic oxide such as alumina, boria, titania, and magnesia, and silica further containing a metal component such as sodium, magnesium, lithium, zirconium, and hafnium, in addition to silica or the above-described silica containing a small amount of another inorganic oxide.

A carrier containing silica has an average pore diameter measured by utilizing a BJH method from an adsorption-desorption isotherm of nitrogen of 8 to 25 nm, preferably 10 to 20 nm. The average pore diameter of the carrier controls the size of a crystallite of the active metal supported on the carrier and existing in the pore, and it is therefore an important factor determining the performance of the catalyst. When the average pore diameter is less than 8 nm, the active metal may migrate excessively to the surface of the catalyst in the step of steaming and the aggregation is excessively progressed, which is not preferred. On the other hand, when the average pore diameter is more than 25 nm, a crystallite of the active metal grows in the pore during the step of steaming and becomes too large, so that the catalyst becomes of low activity.

Although the specific surface area of the carrier containing silica is not particularly limited, the specific surface area measured by a nitrogen adsorption method is preferably 50 to 800 $m^2/g$, more preferably 100 to 500 $m^2/g$.

In addition, although the shape of the carrier containing silica is not particularly limited, in consideration of practicality, a spherical shape, a cylindrical shape, and a cylindrical shape having a modified cross-section such as a three-leaf shape and a four-leaf shape which are generally used in fields of petroleum refining and petrochemical industry, are preferred. In addition, although the particle diameter thereof is also not particularly limited, in terms of practicality, it is preferably 10 μm to 10 mm. Here, for a catalyst used for a slurry bed type reaction apparatus preferably used when the FT synthesis reaction is effected, from the viewpoint of fluidity and the like of the catalyst, the shape of the catalyst is preferably a spherical shape, and the average particle diameter thereof is preferably 10 to 300 μm, more preferably 30 to 150 μm.

The carrier constituting the FT synthesis catalyst of the present embodiments is preferably silica containing at least zirconium. When the carrier contains zirconium, the activity of the catalyst is enhanced and in the FT synthesis, an activity decrease of the catalyst with time can be suppressed. Zirconium is supported on particles containing silica preferably in a state of zirconium oxide. In addition, this zirconium oxide is preferably supported selectively in the proximity of the outer surface of particles containing silica. Here, "particles containing silica" refers to, besides silica particles, silica particles containing a small amount of an inorganic oxide such as alumina, boria, titania, and magnesia, and silica particles further containing a metal component such as sodium, magnesium, lithium, zirconium, and hafnium, in addition to silica or the above-described silica containing a small amount of another inorganic oxide. In addition, characteristics of said particles containing silica, that is an average pore diameter, a specific surface area, a shape, and an average particle diameter are the same as that of the above-described carrier containing silica, and therefore, explanation is omitted in terms of avoiding redundancy.

Although the method of loading zirconium on particles containing silica is not particularly limited, by adopting the following method, zirconium can be loaded selectively in the proximity of the outer surface of particles containing silica. First, particles containing silica are subjected to a pretreatment with an aqueous solution having a pH value of 7 or lower. At this time, examples of the aqueous solution (pretreating solution) having a pH value of 7 or lower include a nitric acid aqueous solution, an acetic acid aqueous solution, a sulfuric acid aqueous solution, a hydrochloric acid aqueous solution, ion-exchanged water, and distilled water. The pretreating solution has a pH value of, preferably 5 to 7, more preferably 6 to 7. When the pH value is lower than 5, in order to load a zirconium compound in a necessary amount in the loading of a zirconium compound performed after the pretreatment, the concentration of the used zirconium compound solution is necessary to be increased, which is economically not preferred. The pretreatment can be performed, for example, by adding a pretreating solution into a container containing particles containing silica. The time for immersing particles containing silica in the pretreating solution is preferably around 10 to 72 hours in the case of leaving the pretreating solution at rest, around 1 to 12 hour(s) in the case of applying vibration to the pretreating solution, and around 1 to 30 minute(s) in the case of irradiating the pretreating solution with a supersonic wave. Irradiating the pretreating solution in which the particles containing silica is immerged with a supersonic wave is preferably performed in order to remove bubbles existing in the pore in the particles containing silica.

After the pretreatment, by adding an excessive amount of a solution containing a zirconium compound into a container containing the particles containing silica that has been subjected to the pretreatment to immerse the particles containing silica in the solution, a zirconium compound can be loaded on the particles containing silica (step of loading zirconium). At this time, a supernatant portion of the pretreating solution after the pretreatment is preferably removed beforehand. Here, "the excessive amount" means a volume amount which is two times or more the apparent volume constituted by the particles containing silica. Examples of the usable zirconium compound include zirconyl sulfate, zirconyl acetate, zirconyl ammonium carbonate, and zirconium trichloride, and among them, zirconyl ammonium carbonate and zirconyl acetate are preferred.

The amount of zirconium to be loaded is preferably 0.5 to 10% by mass, more preferably 2 to 6% by mass as zirconium oxide, based on the mass of the catalyst (FT synthesis catalyst). When the loading amount is less than 0.5% by mass, the effect of enhancing the activity of the catalyst and the like by adding zirconium tends to become unsatisfactory, whereas when the loading amount is more than 10% by mass, the above effect is not further enhanced, which tends to become economically disadvantageous. Although the time for immerse the particles containing silica in a solution containing a zirconium compound to load zirconium on the particles containing silica depends on the objective loading amount and is not particularly limited, it is ordinarily 3 to 72 hours.

After the completion of the loading of a zirconium compound, the remaining solution containing the zirconium compound and the solid (the particles containing silica on which a zirconium compound is loaded) are separated by solid-liquid separation means such as filtration, the solid thus separated is washed with water, and the solid is dried. The drying method is not particularly limited and examples thereof include heating-drying in air and evacuating-drying under reduced pressure. Ordinarily, the drying is performed at a temperature of 100 to 200° C., preferably 110 to 130° C. for 2 to 24 hours, preferably 5 to 12 hours.

After the drying, in order to convert the zirconium compound into an oxide, the particles containing silica on which a zirconium compound is loaded may be calcined (step of calcining the carrier). Although the calcining condition is not particularly limited, the calcining may ordinarily be performed at 340 to 600° C., preferably 400 to 450° C. in an air atmosphere for 1 to 5 hour(s). Here, the calcining in this stage may not be performed and instead of the calcining in this stage, the calcining may be performed after loading the active metal. Thus, the carrier on which a zirconium compound is supported can be obtained.

Next, on the carrier obtained as described above, cobalt as the active metal is loaded supported (step of loading the active metal). Although examples of the active metal in an FT synthesis catalyst ordinarily include cobalt, ruthenium, and iron, as the active metal in the FT synthesis catalyst of the present embodiments, cobalt or a combination of cobalt with ruthenium is preferred. The cobalt compound used for performing the loading of cobalt is not particularly limited and a salt of a mineral acid or an organic acid or complex can be used. Specific examples thereof include cobalt nitrate, cobalt chloride, cobalt formate, cobalt propionate, cobalt acetate, and cobalt acetylacetonate. Examples of the ruthenium compound used when ruthenium is supported together with cobalt include ruthenium chloride, ruthenium nitrate, and tetraoxoruthenate.

The loading amount of cobalt is 10 to 30% by mass, preferably 15 to 25% by mass as a metal atom, based on the mass of the catalyst (FT synthesis catalyst). When the loading amount is less than 10% by mass, the activity of the catalyst tends to become unsatisfactory, whereas when the loading amount is more than 30% by mass, an activity lowering of the catalyst due to an aggregation of cobalt is easily caused and simultaneously, the specific gravity of the catalyst becomes large, so that when such a catalyst is used in a slurry bed type reaction apparatus, it tends to become difficult to secure the fluidity of the catalyst.

The loading method of a cobalt compound is not particularly limited and as the loading method, a publicly-known method is utilized and an impregnation method typified by the Incipient Wetness method can be preferably used.

A carrier supporting a cobalt compound is dried, for example, at a temperature of 100 to 200° C., preferably 110 to 130° C. for 2 to 24 hours, preferably 5 to 10 hours and then, is calcined at 340 to 600° C., preferably 400 to 500° C. in an air atmosphere for 1 to 5 hour(s) to convert the cobalt compound into an oxide to obtain a catalyst precursor (step of calcining).

Next, in order to impart the activity as an FT synthesis catalyst, the catalyst precursor is reduced to convert the cobalt oxide into metallic cobalt (step of first reduction). Reduction is performed in an atmosphere containing molecular hydrogen. Although the gas used for reduction is not particularly limited so long as the gas contains molecular hydrogen (hydrogen gas), the gas is a gas containing molecular hydrogen in a content of preferably 70% by volume or more, more preferably 95% by volume or more. When the content of molecular hydrogen is less than 70% by volume, the reducing efficiency tends to become unsatisfactory, which is not preferred. Specific examples of the gas used for reduction include a hydrogen gas and a mixed gas of a hydrogen gas with an inert gas such as a nitrogen gas, and among them, a hydrogen gas is particularly preferred. Here, when the gas used for reduction further contains carbon monoxide, during reduction, the FT synthesis reaction is effected and it is concerned that the problem of a heat generation or the like is caused, which is not preferred; however, the contamination of carbon monoxide in a trace amount can be allowed.

The temperature for reduction is preferably 250 to 500° C., more preferably 350 to 450° C. When the temperature for reduction is less than 250° C., the reduction degree of a cobalt atom (ratio of the number of moles of a cobalt atom in a metal state relative to the number of moles of a cobalt atom in all states in the catalyst after the step of reduction) tends to be not satisfactorily enhanced. On the other hand, when the temperature for reduction is higher than 500° C., aggregation of metallic cobalt is excessively progressed so that the activity of the catalyst tends to be lowered.

Although the pressure for the step of first reduction is not particularly limited, normal pressure to around 5 MPa is selected.

The time for reduction largely depends on the temperature, the atmosphere, the apparatus to be used, and the like so that it is difficult to determine the time for reduction in a simple manner; however, it is generally around 0.5 to 60 hours.

The step of first reduction may be performed in a catalyst producing equipment, or an equipment for performing the production of hydrocarbons by the FT synthesis method or equipments annexed thereto.

Next, the catalyst obtained through the step of first reduction is subjected to a treatment with a mixed gas containing steam and an inert gas while being heated (step of steaming) The present step of steaming is the most important step in the method for producing the FT synthesis catalyst of the present invention.

The content of steam in the mixed gas used in the step of steaming is 1 to 30% by volume, preferably 5 to 20% by volume. When the content of steam is less than 1% by volume, the migration of metallic cobalt to the outer surface of the carrier which is described below is considered not to satisfactorily progress and the enhancement of the catalyst activity tends to become unsatisfactory. On the other hand, when the content of steam is more than 30% by volume, the migration from inside of the pore of the carrier to the outer surface of the carrier and aggregation of metallic cobalt and/or cobalt oxide are considered to be excessively progressed, so that the catalyst activity tends to be lowered.

The temperature for the step of steaming is 100 to 300° C., preferably 150 to 250° C. When the temperature is lower than 100° C., the migration of metallic cobalt and/or cobalt oxide from inside of the pore of the carrier to the outer surface is considered to be hardly progressed and the catalyst activity tends to be hardly enhanced. On the other hand, when the temperature is higher than 300° C., the migration from inside of the pore of the carrier to the outer surface of the carrier and aggregation of metallic cobalt and/or cobalt oxide are considered to be excessively progressed, so that the catalyst activity tends to be lowered.

Although the pressure for the step of steaming is not particularly limited, normal pressure to around 5 MPa is selected.

Although the time for the step of steaming is largely influenced by the temperature and the like and is not defined in a simple manner, around 0.1 to 10 hours is selected.

The step of steaming may be performed in a catalyst producing equipment, or an equipment for performing the production of hydrocarbons by the FT synthesis method or equipments annexed thereto. Here, when the step of first reduction is performed in an equipment for performing the production of hydrocarbons the FT synthesis method or equipments annexed thereto, consequently, also the step of steaming is performed in the same equipment.

In the FT synthesis reaction, by a reaction between molecular hydrogen and carbon monoxide, hydrocarbons and simultaneously water in a large amount as a by-product are generated, so that steam exists constantly in an FT synthesis reaction apparatus. Accordingly, the FT synthesis catalyst is constantly exposed to steam during the reaction. Nevertheless, it was entirely unexpected that by performing the step of steaming according to the method for producing the FT synthesis catalyst of the present invention, the activity of the FT synthesis catalyst is enhanced.

Although the reduction degree of a cobalt atom contained in the thus obtained FT synthesis catalyst is rather lowered by a weak oxidation action of steaming in comparison with a cobalt atom in a catalyst that has been subjected to the step of first reduction and has not yet been subjected to the step of steaming, the catalyst as it is can also be subjected to the FT synthesis reaction. This is because by a reduction action of molecular hydrogen and carbon monoxide which are feedstocks for the FT synthesis reaction, the cobalt atom is reduced again during the reaction. On the other hand, in order to bring reliably the reduction degree of the cobalt atom in the catalyst into high from the stage of initiation of the FT synthesis reaction, it is preferred to reduce the catalyst again before subjecting the catalyst to the FT synthesis reaction (step of second reduction).

The gas used as an atmosphere for the step of second reduction is preferably a gas containing molecular hydrogen or carbon monoxide. The gas containing molecular hydrogen may be the same gas as the gas used in the step of first reduction. In this case, the temperature and the pressure for reduction may be the same as those in the step of first reduction and although the time for reduction is not necessarily defined, it is around 0.5 to 30 hours.

In addition, in the step of second reduction, a gas containing carbon monoxide and no molecular hydrogen may also be used as the atmosphere for reduction. Although the gas containing carbon monoxide is not particularly limited, examples thereof include a carbon monoxide gas and a mixed gas of carbon monoxide with an inert gas such as nitrogen, and a carbon monoxide gas is preferred. Here, when the gas contains molecular hydrogen, it is concerned that water which may inhibit reduction of cobalt oxide is generated and that the FT synthesis reaction by carbon monoxide and molecular hydrogen is effected to cause the problem of heat generation and the like. Therefore, the gas contains preferably no molecular hydrogen, with proviso that the contamination of the gas with molecular hydrogen in a trace amount is allowed.

In the step of second reduction, when a gas containing carbon monoxide is used as the atmosphere, the temperature for reduction is 200 to 400° C., preferably 250 to 350° C. When the temperature is lower than 200° C., a satisfactory reduction degree of the cobalt atom tends to be hardly obtained. On the other hand, when the temperature is higher than 400° C., a carbon typified by a carbon nanotube tends to be easily generated from carbon monoxide. The pressure for reduction is normal pressure to around 5 MPa and the time for reduction is generally around 0.5 to 30 hours, though it depends largely on the temperature for reduction or the like and it is difficult to define the time in a simple manner.

The step of second reduction may be performed in a catalyst producing equipment, or an equipment for performing the production of hydrocarbons by the FT synthesis method or equipments annexed thereto. Here, when the step of first reduction or the step of steaming is performed in an equipment for performing the production of hydrocarbons by the FT synthesis method or equipments annexed thereto, consequently, also the step of second reduction is performed in the same equipment.

When the FT synthesis catalyst activated by reduction is contacted with air, it is concerned that the activity of the FT synthesis catalyst is lowered by oxidation of the active metal. Thus, particularly when the location of a catalyst producing equipment and the location of an equipment for performing the production of hydrocarbons by the FT synthesis method using the catalyst are away from each other and when the activation by reduction is performed in the catalyst producing equipment, in order not to cause an activity lowering of the catalyst by a contact of the catalyst with air during the transport of the catalyst and the like, the transport of the catalyst and the like is ordinarily performed after subjecting the catalyst to a stabilization treatment. As the specific method for the stabilization treatment, a method of coating the surface of the activated FT synthesis catalyst with a wax or the like to seal the catalyst from the air and a method of slightly oxidizing the surface of the activated FT synthesis catalyst to form an oxide layer to prevent the further progression of oxidation by the contact with air, and the like are generally used.

As described above, with respect to a selection of the catalyst producing equipment or the hydrocarbon producing equipment to perform the step of first reduction, the step of steaming, and the step of second reduction, various combinations can be considered. When at least the step of first reduction is performed in the catalyst producing equipment and the activated catalyst is transported to the hydrocarbon producing equipment, the catalyst is preferably subjected to a stabilization treatment to be transported. Here, in the case of performing the stabilization treatment by a method of coating the surface of the catalyst with a wax or the like, when the step of steaming and/or the step of second reduction are(is) performed in the hydrocarbon producing equipment or equipments attached thereto after the transportation of the catalyst, it is concerned that a disadvantage is caused. That is, before the step of steaming and/or the step of second reduction are(is) performed, a step of removing a wax or the like with which the catalyst is coated becomes necessary. Accordingly, when the catalyst is transported after subjecting the catalyst to the step of first reduction, the stabilization treatment is preferably performed by a method of slightly oxidizing the surface of the activated catalyst. Here, the FT synthesis catalyst of the present invention encompasses all the FT synthesis catalysts which have been subjected to the stabilization treatment after any one of the step of first reduction, the step of steaming, and the step of second reduction.

In the FT synthesis catalyst of the present embodiments produced by the above-described method for producing the FT synthesis catalyst of the present embodiments, the average crystallite diameter of metallic cobalt and/or cobalt oxide must be the average pore diameter of the carrier and more, and less than 35 nm. Here, the average crystallite diameter is measured by an X-ray diffractometry (XRD) and can be obtained using the Scherrer's equation from the half width of $2\theta=44°$ peak (metallic Co) of the XRD.

Generally, the average crystallite diameter of the active metal (containing a metal and oxide thereof) existing in the pore of the carrier is a value smaller than the average pore diameter due to the geometric constraint by the pore. The fact that the average crystallite diameter of metallic cobalt and/or cobalt oxide in the FT synthesis catalyst of the present embodiments is not less than the average pore diameter of the carrier indicates that at least a portion of metallic cobalt and/or cobalt oxide has migrated from the inside of the pore to the outside of the pore, that is, the outer surface of the catalyst by the step of steaming and has been aggregated to some extent at the outer surface. The inventors of the present invention assume that by this migration of the active metal, although the aggregation is caused to some extent, as the ratio of active sites existing on the outer surface of the catalyst relative to active sites existing in the pore is elevated, the FT synthesis reaction activity of the catalyst is enhanced.

In addition, the FT synthesis catalyst of the present embodiments has a cobalt atom/silicon atom molar ratio calculated from an elemental component analysis by an X-ray photoelectron spectroscopy (XPS) of preferably 0.05 to 2.00. XPS is an analysis technique aiming as the analysis object only at a range in which the depth in the sample surface is extremely small (generally 3 to 5 nm). Therefore, the cobalt atom/silicon atom molar ratio obtained by the analysis method becomes an indicator of the concentration of cobalt atoms existing in the proximity of (in micro scale) the outer surface of the catalyst. When the cobalt atom and/or silicon atom molar ratio is less than 0.05, the concentration of cobalt atoms existing in the proximity of the outer surface of the catalyst fails, so that the catalyst tends to have low activity. On the other hand, when the cobalt atom and/or silicon atom molar ratio is more than 2.00, the concentration of cobalt atoms in the proximity of the outer surface of the catalyst is high and metallic cobalt and/or cobalt oxide are(is) excessively aggregated, so that the catalyst tends to have low activity.

The method for producing hydrocarbons by the FT synthesis reaction using the FT synthesis catalyst of the present embodiments and using carbon monoxide and molecular hydrogen as feedstocks is not particularly limited except for using the FT synthesis catalyst of the present embodiments and can adopt a publicly-known method. The reaction apparatus therefor is preferably a fixed-bed reaction apparatus or a slurry-bed reaction apparatus. In addition, the reaction is effected under the condition that the conversion of carbon monoxide as a feedstock is preferably 50% or more, more preferably 55 to 90%.

Hereinafter, the method for producing hydrocarbons using the FT synthesis catalyst of the present embodiments is described referring to an example using a slurry bed type reaction apparatus.

Examples of the usable reaction apparatus include a bubble column type fluidized-bed reaction apparatus. In a bubble column type fluidized-bed reaction apparatus, a slurry in which the FT synthesis catalyst of the present embodiments is suspended in hydrocarbons (ordinarily, FT synthetic hydrocarbons produced in the same reaction apparatus) which are in a liquid form at the reaction temperature, is housed, and into the slurry, a mixed gas (generally, a synthetic gas obtained by reforming of a hydrocarbon such as a natural gas) of a carbon monoxide gas and molecular hydrogen is introduced from the bottom of a reaction column. While the mixed gas ascends in the reaction column in a form of a bubble, the mixed gas is dissolved in the hydrocarbons and when the mixed gas is contacted with the catalyst, hydrocarbons are generated. In addition, by the ascent of bubbles of the mixed gas, the slurry is stirred and the fluidity state thereof is maintained. In the reaction column, a cooling tube in which a coolant for removing a reaction heat is passed through is provided and a reaction heat is removed by heat exchange.

When the FT synthesis catalyst of the present embodiments to be used is supplied in a state in which the catalyst has been subjected to the step of first reduction, the step of steaming, and if necessary, the step of second reduction in the method for producing the FT synthesis catalyst of the present embodiments, and then, to the stabilizing treatment in the catalyst producing equipment, the FT synthesis catalyst as it is may be used in the FT synthesis reaction. Also in the case of a catalyst subjected to a stabilizing treatment by coating with a wax or the like, a wax or the like is dissolved in the hydrocarbons so that the activity of the catalyst is developed. On the other hand, when a catalyst which has not been subjected to the step of first reduction and is in a state of a catalyst precursor in which the active metal is in a state of an oxide is supplied as the catalyst, such a catalyst precursor should be subjected to the step of first reduction, the step of steaming, and if necessary, the step of second reduction in the method for producing the FT synthesis catalyst of the present embodiments in an FT synthesis reaction apparatus or apparatuses attached thereto to be used for the FT synthesis reaction. In addition, when a catalyst in a state in which the catalyst has been subjected to the step of first reduction and the stabilization treatment is supplied in the catalyst producing equipment, the catalyst should be subjected to the step of steaming and if necessary, the step of second reduction in an FT synthesis reaction apparatus or apparatuses attached thereto to be used for the FT synthesis reaction.

The reaction temperature for the FT synthesis reaction can be determined depending on the objective carbon monoxide conversion, and is preferably 150 to 300° C., more preferably 170 to 250° C.

The reaction pressure is preferably 0.5 to 5.0 MPa, more preferably 2.0 to 4.0 MPa. When the reaction pressure is less than 0.5 MPa, the carbon monoxide conversion tends to hardly become 50% or more, whereas when the reaction pressure is more than 5.0 MPa, a localized heat generation tends to be easily caused, which is not preferred.

The ratio (molar ratio) of molecular hydrogen/carbon monoxide in a feedstock gas is preferably 0.5 to 4.0, more preferably 1.0 to 2.5. When the molar ratio is less than 0.5, the reaction temperature is necessary to be raised in order to keep the conversion of carbon monoxide at a predetermined value and the catalyst activity tends to decrease rapidly during the reaction, and on the other hand, when the molar ratio is more than 4.0, the amount of generated methane which is an undesirable by-product tends to increase.

The gas space velocity of the feedstock gas is preferably 500 to 5,000 $h^{-1}$, more preferably 1,000 to 2,500 $h^{-1}$. When the gas space velocity is less than 500 $h^{-1}$, the productivity relative to the same catalyst amount is low and on the other hand, when the gas space velocity is more than 5,000 $h^{-1}$, the conversion of carbon monoxide is hard to become 50% or more, which is not preferred.

The FT synthesis catalyst of the present embodiments has high reaction activity (carbon monoxide conversion) and has high chain growth probability ($\alpha$), so that by using this catalyst, hydrocarbons containing as main components, normal paraffins corresponding to a wax fraction, a middle distillate (kerosene and gas oil fraction), and a naphtha fraction can be obtained with a high yield. Particularly hydrocarbons rich in a wax fraction and a middle distillate can be obtained with a high yield.

The present invention is not limited to the above-described preferred embodiments and to these embodiments, modifications may be accordingly added so long as not departing from the purpose of the present invention.

EXAMPLES

Hereinafter, the present invention will be described more specifically referring to Examples and Comparative Examples which should not be construed as limiting the scope of the present invention.

Example 1

<Catalyst Preparation>

25 g of sphere-shaped silica particles having an average pore diameter of 15 nm and an average particle diameter of 70 μm were weighed in a glass bottle and thereto, 200 mL of distilled water was added, followed by irradiating the resultant mixture with a supersonic wave for 1 hour. Then, distilled water was sucked out of the mixture with a dropping pipette and thereto, 200 mL of a zirconyl ammonium carbonate aqueous solution in a concentration of 0.3 mol/L was added, and after the resultant mixture was irradiated with a supersonic wave for 1 minute, it was left at rest at room temperature for 1 day. The mixture was filtered using a filtration paper and thereafter the resultant solid was washed using 1,000 mL of distilled water (step of loading zirconium). After washing, the obtained solid content was dried at 120° C. overnight and then calcined at 500° C. for 1 hour to obtain a carrier composed of silica containing a zirconium oxide (step of calcining carrier). Next, the carrier was impregnated with an aqueous solution containing cobalt nitrate in an amount which becomes 24% by mass as a cobalt atom, based on the mass of the catalyst after loading, by the Incipient Wetness method (step of loading active metal). After impregnation, the carrier was dried at 120° C. overnight and then calcined at 450° C. for 2 hours to obtain a catalyst precursor (step of calcining). In addition, the obtained catalyst precursor was subjected to a composition analysis. This catalyst precursor was charged in a fixed-bed circulation type reaction apparatus and was subjected to reduction in a hydrogen gas stream at 400° C. for 7 hours (step of first reduction). Subsequently, the reduced catalyst precursor was subjected to steaming in a stream of a mixed gas in a volume ratio of steam/nitrogen gas=10/90 at 220° C. for 1 hour in the same reaction apparatus to obtain a FT synthesis catalyst (step of steaming). Further subsequently, the FT synthesis catalyst obtained through the steaming step was subjected to reduction in a hydrogen gas stream at 400° C. for 3 hours in the same reaction apparatus (step of second reduction). Thus, the objective FT synthesis catalyst was obtained. The obtained FT synthesis catalyst is composed of metallic cobalt, cobalt oxide, silica, and zirconium oxide, and from the result of the composition analysis of the catalyst precursor, the loading amount of cobalt as a metal atom, and the loading amount of zirconium oxide in the FT synthesis catalyst were calculated. The result is shown in Table 1.

<Analysis>

[XRD Analysis]

A portion of the FT synthesis catalyst obtained by the above catalyst preparation as a sample for the analysis was immersed in decane in an inert atmosphere. A portion of thus prepared sample was transferred into an X-ray diffraction analysis (XRD) apparatus in an inert atmosphere to subject the sample to the analysis. The XRD was carried out using CuKα as a X-ray source in the range of 2θ=5-90°, and an average crystallite diameter was obtained from the half width of 2θ=44° peak (metallic Co) using the Scherrer's equation. The result is shown in Table 1.

[XPS Analysis]

A portion of the catalyst sample immersed in decane was subjected to the analysis using an X-ray photoelectron spectroscopic analysis (XPS) apparatus in an inert atmosphere. As the XPS apparatus, PHI Quantera SXM was used; as an X-ray source, AlKα (using a monochromator) was used; and as the analysis range, a diameter of 250 μm was used. From the XPS analysis result, the molar ratio of Co/Si was calculated. The result is shown in Table 1.

<Reaction Evaluation>

5 g of the FT synthesis catalyst obtained by the above catalyst preparation was transferred together with 30 mL of cetane into an autoclave having an internal volume of 100 mL in an inert atmosphere and the resultant mixture was subjected to the FT synthesis reaction in the autoclave. A mixed gas having a molar ratio of hydrogen gas/carbon monoxide (CO)=2/1 was used as the feedstock and flown continuously through the autoclave, and the reaction was conducted under conditions of W (catalyst mass)/F (mixed gas flow rate)=3 g·h/mol, at a temperature of 230° C., under a pressure of 2.3 MPa, and at a stirring rate of 1,000 rpm. The gas composition at an outlet of the autoclave was analyzed with time by gas chromatography and from the analysis data, the CO conversion was calculated. In addition, the generated hydrocarbons were analyzed by gas chromatography and the chain growth probability was measured according to a conventional method. The result is shown in Table 1.

Example 2

<Catalyst Preparation>

Sphere-shaped silica particles having an average pore diameter of 12 nm and an average particle diameter of 70 μm were impregnated with an aqueous solution containing cobalt nitrate in an amount which becomes 26% by mass as a cobalt atom, based on the mass of the catalyst after loading, by the Incipient Wetness method (step of loading active metal). After impregnation, the carrier was dried at 120° C. overnight and then calcined at 450° C. for 2 hours to obtain a catalyst precursor (step of calcining). In addition, the obtained catalyst precursor was subjected to a composition analysis. This catalyst precursor was charged in a fixed-bed circulation type reaction apparatus and was subjected to reduction in a hydrogen gas stream at 400° C. for 12 hours (step of first reduction). Subsequently, the reduced catalyst precursor was subjected to steaming in a stream of a mixed gas in a volume ratio of steam/nitrogen=5/95 at 220° C. for 2 hours in the same reaction apparatus to obtain a FT synthesis catalyst (step of steaming). Further subsequently, the FT synthesis catalyst obtained through the steaming step was subjected to reduction in a hydrogen gas stream at 400° C. for 3 hours in the same reaction apparatus (step of second reduction). Thus, the objective FT synthesis catalyst was obtained. The obtained FT synthesis catalyst is composed of metallic cobalt, cobalt oxide, and silica, and the loading amount of cobalt was calculated in substantially the same manner as in Example 1. The result is shown in Table 1.

<Analysis>

The FT synthesis catalyst was subjected to the analysis in substantially the same manner as in Example 1. The result is shown in Table 1.

<Reaction Evaluation>

The FT synthesis catalyst was subjected to the reaction evaluation in substantially the same manner as in Example 1. The result is shown in Table 1.

Example 3

The catalyst preparation, the analysis, and the reaction evaluation were performed in substantially the same manner as in Example 1, except that the reduction after steaming (step of second reduction) was not performed. In addition, the obtained FT synthesis catalyst is composed of metallic cobalt, cobalt oxide, silica, and zirconium oxide, and the loading amounts of cobalt and zirconium oxide were calculated in substantially the same manner as in Example 1. The result is shown in Table 1.

Example 4

The catalyst preparation, the analysis, and the reaction evaluation were performed in substantially the same manner as in Example 1, except that the conditions for reduction after steaming (step of second reduction) were changed to in a stream of carbon monoxide, at 300° C., and for 3 hours respectively. In addition, the obtained FT synthesis catalyst is composed of metallic cobalt, cobalt oxide, silica, and zirconium oxide, and the loading amounts of cobalt and zirconium oxide were calculated in substantially the same manner as in Example 1. The result is shown in Table 1.

Comparative Example 1

<Catalyst Preparation>

25 g of sphere-shaped silica particles having an average pore diameter of 6 nm and an average particle diameter of 70 μm were weighed in a glass bottle and thereto, 200 mL of distilled water was added, followed by irradiating the resultant mixture with a supersonic wave for 1 hour. Then, distilled water was sucked out of the mixture with a dropping pipette and thereto, 200 mL of a zirconyl ammonium carbonate aqueous solution in a concentration of 0.3 mol/L was added, and after the resultant mixture was irradiated with a supersonic wave for 1 minute, it was left at rest at room temperature for 1 day. The mixture was filtered using a filtration paper and thereafter the resultant solid was washed using 1,000 mL of distilled water. After washing, the obtained solid was dried at 120° C. overnight and then calcined at 500° C. for 1 hour to obtain a carrier composed of silica containing a zirconium oxide. Next, the carrier was impregnated with an aqueous solution containing cobalt nitrate in an amount which becomes 12% by mass as a Co atom, based on the mass of the catalyst after loading, by the Incipient Wetness method. After impregnation, the carrier was dried at 120° C. overnight and then calcined at 450° C. for 2 hours to obtain a catalyst precursor. In addition, the obtained catalyst precursor was subjected to a composition analysis. This catalyst precursor was charged in a fixed-bed circulation type reaction apparatus and was subjected to reduction in a hydrogen gas stream at 400° C. for 7 hours. Subsequently, the reduced catalyst precursor was subjected to steaming in a stream of a mixed gas in a volume ratio of steam/nitrogen=10/90 at 220° C. for 1 hour in the same reaction apparatus to obtain a FT synthesis catalyst. Subsequently, the FT synthesis catalyst obtained by the steaming was subjected to reduction in a stream of hydrogen at 400° C. for 3 hours in the same reaction apparatus. Thus, the FT synthesis catalyst for comparison was obtained. The obtained FT synthesis catalyst for comparison is composed of metallic cobalt, cobalt oxide, silica, and zirconium oxide, and the loading amounts of cobalt and zirconium oxide were calculated in substantially the same manner as in Example 1. The result is shown in Table 2.

<Analysis>

The FT synthesis catalyst for comparison was subjected to the analysis in substantially the same manner as in Example 1. The result is shown in Table 2.

<Reaction Evaluation>

The FT synthesis catalyst for comparison was subjected to the reaction evaluation in substantially the same manner as in Example 1. The result is shown in Table 2.

Comparative Example 2

<Catalyst Preparation>

25 g of sphere-shaped silica particles having an average pore diameter of 28 nm and an average particle diameter of 70 μm were weighed in a glass bottle and thereto, 200 mL of distilled water was added, followed by irradiating the resultant mixture with a supersonic wave for 1 hour. Then, distilled water was sucked out of the mixture with a dropping pipette and thereto, 200 mL of a zirconyl ammonium carbonate aqueous solution in a concentration of 0.3 mol/L was added, and after the resultant mixture was irradiated with a supersonic wave for 1 minute, it was left at rest at room temperature for 1 day. The mixture was filtered using a filtration paper and thereafter the resultant solid was washed using 1,000 mL of distilled water. After washing, the obtained solid was dried at 120° C. overnight and next, calcined at 500° C. for 1 hour to obtain a carrier composed of silica containing zirconium oxide. Next, the carrier was impregnated with an aqueous solution containing cobalt nitrate in an amount which becomes 25% by mass as a cobalt atom, based on the mass of the catalyst after loading, by the Incipient Wetness method. After impregnation, the carrier was dried at 120° C. overnight and then calcined at 450° C. for 2 hours to obtain a catalyst precursor. In addition, the obtained catalyst precursor was subjected to a composition analysis. This catalyst precursor was charged in a fixed-bed circulation type reaction apparatus and was subjected to reduction in a hydrogen stream at 400° C. for 7 hours. Subsequently, the reduced catalyst precursor was subjected to steaming in a stream of a mixed gas in a volume ratio of steam/nitrogen=10/90 at 220° C. for 1 hour in the same reaction apparatus to obtain a FT synthesis catalyst. Next, the FT synthesis catalyst obtained by the steaming was subjected to reduction in a stream of hydrogen at 400° C. for 3 hours in the same reaction apparatus. Thus, the FT synthesis catalyst for comparison was obtained. The obtained FT synthesis catalyst for comparison is composed of metallic cobalt, cobalt oxide, silica, and zirconium oxide, and the loading amounts of cobalt and zirconium oxide were calculated in substantially the same manner as in Example 1. The result is shown in Table 2.

<Analysis>

The FT synthesis catalyst for comparison was subjected to the analysis in substantially the same manner as in Example 1. The result is shown in Table 2.

<Reaction Evaluation>

The FT synthesis catalyst for comparison was subjected to the reaction evaluation in substantially the same manner as in Example 1. The result is shown in Table 2.

Comparative Example 3

The catalyst preparation, the analysis, and the reaction evaluation were performed in substantially the same manner as in Example 1, except that the step of steaming was not performed. In addition, the obtained FT synthesis catalyst is composed of metallic cobalt, cobalt oxide, silica, and zirconium oxide, and the loading amounts of cobalt and zirconium oxide were calculated in substantially the same manner as in Example 1. The result is shown in Table 2.

Comparative Example 4

The catalyst preparation, the analysis, and the reaction evaluation were performed in substantially the same manner as in Example 2, except that the step of steaming was not performed. In addition, the obtained FT synthesis catalyst is composed of metallic cobalt, cobalt oxide, and silica, and the loading amount of cobalt was calculated in substantially the same manner as in Example 1. The result is shown in Table 2.

Comparative Example 5

The catalyst preparation, the analysis, and the reaction evaluation were performed in substantially the same manner as in Example 1, except that the volume ratio of the atmosphere in the step of steaming was changed to steam/nitrogen gas=33/67. In addition, the obtained FT synthesis catalyst is composed of metallic cobalt, cobalt oxide, silica, and zirconium oxide, and the loading amounts of cobalt and zirconium oxide were calculated in substantially the same manner as in Example 1. The result is shown in Table 2.

As shown in Table 1 and Table 2, when the average pore diameter of the carrier is less than the lower limit of the FT synthesis catalyst of the present invention (Comparative Example 1) and when steaming is excessively performed (Comparative Example 5), it is indicated that cobalt in the pore migrates excessively to the outer surface by steaming and is aggregated, so that the activity of the catalyst is lowered. In addition, when the average pore diameter of the carrier is more than the upper limit of the FT synthesis catalyst of the present invention (Comparative Example 2) and when steaming is not performed (Comparative Examples 3 and 4), it is indicated that the migration of cobalt in the pore to the outside of the pore is hardly caused, so that the enhancement of the catalyst activity is not observed. Here, in Comparative Example 2, lowering of the catalyst activity assumed to be due to aggregation of cobalt in the pore is observed. On the other hand, with respect to the FT synthesis catalyst of the present invention (Examples 1 to 4), by using a carrier having a moderate average pore diameter and by performing moderate steaming, the enhancement of the catalyst activity assumed to be due to a moderate migration and aggregation of cobalt is observed, and a high chain growth probability is maintained.

TABLE 1

|  |  |  | Example 1 | Example 2 | Example 3 | Example 4 |
|---|---|---|---|---|---|---|
| Carrier | Average pore diameter | nm | 15 | 12 | 15 | 15 |
| loading amount | Co | mass % | 24 | 26 | 24 | 24 |
| of Co, ZrO$_2$ | ZrO$_2$ | mass % | 4 | 0 | 4 | 4 |
| Step of first | Atmosphere |  | hydrogen | hydrogen | hydrogen | hydrogen |
| reduction | Temperature | ° C. | 400 | 400 | 400 | 400 |
|  | Time | hr | 7 | 12 | 7 | 7 |
| Step of | Atmosphere |  | steam/nitrogen = 10/90 | steam/nitrogen = 5/95 | steam/nitrogen = 10/90 | steam/nitrogen = 10/90 |
| steaming | Temperature | ° C. | 220 | 220 | 220 | 220 |
|  | Time | hr | 1 | 2 | 1 | 1 |
| Step of second | Atmosphere |  | hydrogen | hydrogen | none | carbon monoxide |
| reduction | Temperature | ° C. | 400 | 400 |  | 300 |
|  | Time | hr | 3 | 3 |  | 3 |
| Physical properties | Co average crystallite | nm | 16 | 15 | 15 | 16 |
| of FT synthesis | diameter |  |  |  |  |  |
| catalyst | Co/Si (XPS) |  | 0.14 | 0.18 | 0.10 | 0.14 |

TABLE 1-continued

|  |  |  | Example 1 | Example 2 | Example 3 | Example 4 |
|---|---|---|---|---|---|---|
| Reaction performance | CO conversion | % | 78 | 76 | 77 | 78 |
|  | Chain growth probability |  | 0.915 | 0.912 | 0.915 | 0.916 |

TABLE 2

|  |  |  | Comparative Example 1 | Comparative Example 2 | Comparative Example 3 | Comparative Example 4 | Comparative Example 5 |
|---|---|---|---|---|---|---|---|
| Carrier | Average pore diameter | nm | 6 | 28 | 15 | 12 | 15 |
| loading amount of Co, $ZrO_2$ | Co | mass % | 12 | 25 | 24 | 26 | 24 |
|  | $ZrO_2$ | mass % | 4 | 4 | 4 | 0 | 4 |
| Step of first reduction | Atmosphere |  | hydrogen | hydrogen | hydrogen | hydrogen | hydrogen |
|  | Temperature | °C. | 400 | 400 | 400 | 400 | 400 |
|  | Time | hr | 7 | 7 | 7 | 12 | 7 |
| Step of steaming | Atmosphere |  | steam/ nitrogen = 10/90 | steam/ nitrogen = 10/90 | none | none | steam/ nitrogen = 33/67 |
|  | Temperature | °C. | 220 | 220 |  |  | 220 |
|  | Time | hr | 1 | 1 |  |  | 1 |
| Step of second reduction | Atmosphere |  | hydrogen | hydrogen | hydrogen | hydrogen | hydrogen |
|  | Temperature | °C. | 400 | 400 | 400 | 400 | 400 |
|  | Time | hr | 3 | 3 | 3 | 3 | 3 |
| Physical properties of FT synthesis catalyst | Co average crystallite diameter | nm | 16 | 20 | 10 | 8 | 36 |
|  | Co/Si(XPS) |  | 2.10 | 0.04 | 0.03 | 0.04 | 2.25 |
| Reaction performance | CO conversion | % | 61 | 69 | 70 | 67 | 58 |
|  | Chain growth probability |  | 0.895 | 0.910 | 0.914 | 0.910 | 0.889 |

INDUSTRIAL APPLICABILITY

As described above, according to the present invention, an FT synthesis catalyst having high activity in which the distribution of an active metal in the inside/outside of a pore of a carrier is controlled, a method for producing the catalyst, and an efficient method for producing a hydrocarbon using the catalyst are provided.

The invention claimed is:

1. A method, comprising:
   loading an active metal for loading a cobalt compound on a carrier containing silica having an average pore diameter of 8 to 25 nm so that the loading amount of the cobalt compound as a cobalt atom becomes 10 to 30% by mass, based on the mass of the catalyst;
   calcining the carrier supporting the cobalt compound to obtain a catalyst precursor in which the cobalt compound is converted into cobalt oxide;
   reducing the catalyst precursor in an atmosphere containing at least molecular hydrogen to obtain a reduced catalyst precursor; and
   steaming the reduced catalyst precursor with a mixed gas containing 1 to 30% by volume of steam and an inert gas at a temperature of 100 to 300° C. to obtain a Fischer-Tropsch synthesis catalyst;
   wherein the Fischer-Tropsch synthesis catalyst comprises 10 to 30% by mass, as a metal atom, of metallic cobalt and/or cobalt oxide, based on the mass of the catalyst, supported on a carrier containing silica,
   the carrier has an average pore diameter of 8 to 25 nm, and
   the metallic cobalt and/or cobalt oxide has an average crystallite diameter of not less than the average pore diameter of the carrier and less than 35 nm.

2. The method according to claim 1, comprising:
   loading 0.5 to 10% by mass of zirconium as zirconium oxide, based on the mass of the catalyst, on particles containing silica having an average pore diameter of 8 to 25 nm; and
   calcining the zirconium-loaded particles containing silica to obtain the carrier containing silica before the loading an active metal.

3. The method according to claim 1, comprising
   further reducing the Fischer-Tropsch synthesis catalyst in an atmosphere containing molecular hydrogen or carbon monoxide.

4. The method according to claim 1, further comprising
   subjecting a feedstock containing carbon monoxide and molecular hydrogen to a Fischer-Tropsch synthesis reaction in the presence of the Fischer-Tropsch synthesis catalyst to synthesize hydrocarbons.

* * * * *